(12) United States Patent
Ryu

(10) Patent No.: US 8,936,844 B2
(45) Date of Patent: Jan. 20, 2015

(54) COMPOSITE CHASSIS FRAME AND METHOD FOR MANUFACTURING THE SAME

(75) Inventor: Seung Hun Ryu, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 304 days.

(21) Appl. No.: 13/488,278

(22) Filed: Jun. 4, 2012

(65) Prior Publication Data

US 2013/0156991 A1 Jun. 20, 2013

(30) Foreign Application Priority Data

Dec. 14, 2011 (KR) .......................... 10-2011-0134172

(51) Int. Cl.
*B32B 15/082* (2006.01)
*B62D 21/00* (2006.01)

(52) U.S. Cl.
USPC .............. 428/71; 280/80.1; 280/781; 428/68; 428/76; 156/196; 156/221

(58) Field of Classification Search
CPC ........ B62D 21/02; B62D 21/00; B62D 21/07; B29C 70/68
USPC .......................... 428/71, 68, 76; 280/80.1, 781
See application file for complete search history.

(56) References Cited

FOREIGN PATENT DOCUMENTS

| KR | 2002-0088763 A | 11/2002 |
|---|---|---|
| KR | 10-2010-0012488 A | 2/2010 |
| KR | 10-2011-0064096 A | 6/2011 |
| KR | 10-2011-0069234 A | 6/2011 |

*Primary Examiner* — Brent O'Hern
(74) *Attorney, Agent, or Firm* — Morgan, Lewis & Bockius LLP

(57) ABSTRACT

A composite chassis frame may include a primarily-formed core material having a steel core material and internal composite materials laminated on both surfaces of the steel core material, an internal core material disposed between the primarily-formed core materials, wherein the primarily-formed core materials may be laminated on both surfaces of the internal core material, and a secondarily-formed external composite material covering outer surfaces of the primarily-formed core materials and the internal core material as a skin material.

9 Claims, 4 Drawing Sheets

[PRIMARY FORMATION]  [SECONDARY FORMATION]

COMPOSITE CHASSIS FRAME AND METHOD FOR MANUFACTURING THE SAME

CROSS-REFERENCE TO RELATED APPLICATION

The present application claims priority to Korean Patent Application No. 10-2011-0134172 filed Dec. 14, 2011, the entire contents of which is incorporated herein for all purposes by this reference.

BACKGROUND

1. Field of the Invention

The present invention relates to a composite chassis frame and a method for manufacturing the chassis frame. More particularly, it relates to a composite chassis frame and a method for manufacturing the chassis frame, which prevents thermal deformation of a steel core material and has sufficient rigidity and stiffness.

2. Description of Related Art

In the case of electric vehicles or hybrid vehicles, the vehicles need to be reduced in weight to improve fuel efficiency. However, since components formed of metal occupy about 70% of the whole weight, there is a limitation in modifying design to reduce the weight of a vehicle. Accordingly, many studies are being conducted to replace metal materials with composite materials that are lightweight materials.

However, there are difficulties in manufacturing the frame of a small-to-medium sized bus using composite materials.

Regarding strength, the yield strength of composite materials such as Carbon Fiber Reinforced Plastic is similar to that of a steel frame. However, since the young's modulus (E) of the composite material that is one of material properties in terms of stiffness reaches about 20% to about 30% of that of the steel frame, the thickness or the sectional size of the composite material has to be increased to maintain a stiffness equal to that of the steel frame.

On the other hand, frames of commercialized vehicles equipped with suspensions need to meet the following two requirements.

First, deformation due to the axle load needs to be small. When the stiffness gets greater, the frames are less deformed from given loads, and the handling stability improves because a hard point of the suspension does not move.

Second, a suspension mounting bracket and a frame are mounted with hardware such as bolts. When the thread of bolt is directly created on a composite material frame for fastening, the thread may be abraded, making it to secure a bolt fastening strength. Accordingly, when a commercialized vehicle frame is configured using composite materials, the commercialized vehicle frame can perform its function only when some steel materials are inserted into the frame to increase the efficiency of stiffness and the coupling strength of the bolts.

However, when a composite material is used as an external skin, and steel or foam materials are inserted into the inside to undergo a high temperature formation, deformation of steel may occur, causing a difficulty in adjusting the dimensions of the composite material frame.

Hereinafter, a typical composite material will be described in more detail.

As shown in FIG. 1, frames for low-floor buses are formed of metal to serve as a backbone of a vehicle, and support a suspension such as a leaf spring.

Also, since the frame of the low-floor bus does not have an integral structure in which a front side is connected to a rear side, but have a structure in which a front frame 100 and a rear frame 200 are connected to a center floor 300, a suspension is generally coupled to the front frame and the rear frame by bolting.

Accordingly, the steel frame will be not limited by bolt mounting.

FIG. 2 is a view illustrating a rear frame of a low-floor bus. A rear frame 200 includes a floor connector 202, a suspension connector 201, and an upper body connector.

When the rear frame is formed of composite materials, Carbon Fiber Reinforced Plastic (CFRP) or Glass Fiber Reinforced Plastic (GFRP) used as a skin, and steel and foam as cores are laminated inside the frame mold (not shown), and are hardened at a temperature of about 100° C. to about 150° C. to manufacture a composite materials rear frame.

When the frame of the suspension connector 201 is manufactured, the composite materials skin, and steel and internal core materials are laminated and cured at a high temperature at once. In this case, a stiffness difference of each material may cause deformation of the core materials, reducing the quality of the product.

Accordingly, as shown in FIG. 3, since the steel core material laminated together with the foam cannot become vertical due to deformation of the foam used as the core material, requirements for mounting a suspension cannot be satisfied.

In the case of a typical product in which foam and steel materials are directly bonded and external composite materials are laminated to cure at a high temperature, there is a limitation in that the steel material is deviated from its vertical position together with the deformation of the foam material due to the stiffness difference between the foam material and the steel material.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a composite chassis frame and a method for manufacturing the chassis frame, which can prevent thermal deformation of a steel material and have sufficient rigidity and stiffness by avoiding direct contact between a foam material and a steel, where an internal composite material is stacked on a steel core material to perform primary curing and then the primarily cured product is stacked on a foam material and an external composite material skin is secondarily formed on the outer side thereof In an aspect of the present invention, a composite chassis frame may include a primarily-formed core material having a steel core material and internal composite materials laminated on both surfaces of the steel core material, an internal core material disposed between the primarily-formed core materials, wherein the primarily-formed core materials are laminated on both surfaces of the internal core material, and a secondarily-formed external composite material covering outer surfaces of the primarily-formed core materials and the internal core material as a skin material.

The number of internal composite materials laminated on one surface of the steel core material is equal to the number of internal composite materials laminated on the other surface of the steel core material.

The primarily-formed core material and the internal core material are mutually laminated in a multi-layer.

The internal composite materials and the external composite material are formed of carbon fiber reinforced plastic or glass fiber reinforced plastic.

The internal core material may include a polyvinyl chloride foam or a Balsa material.

In another aspect of the present invention, a method for manufacturing a composite chassis frame, may include laminating internal composite materials on both surfaces of a steel core material and then performing primary forming and curing to form a primarily-formed core material, laminating the primarily-formed core material on both surface of an internal core material, and covering an external composite material over a whole outer surface of the primarily-formed core material and the internal core material, and then performing secondary forming and curing.

The internal composite materials and the external composite material are formed of carbon fiber reinforced plastic or glass fiber reinforced plastic.

The internal core material may include a polyvinyl chloride foam or a Balsa material.

The number of internal composite materials laminated on one surface of the steel core material is equal to the number of internal composite materials laminated on the other surface of the steel core material.

Other aspects and exemplary embodiments of the invention are discussed infra.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
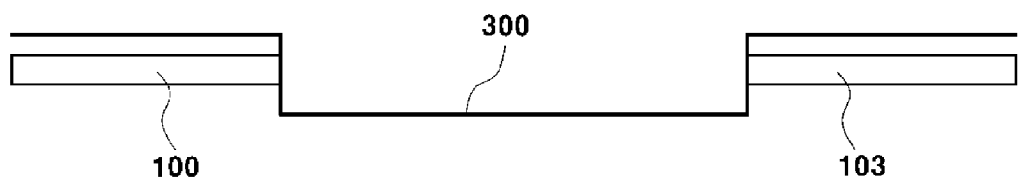
FIG. 1 is a view illustrating a frame structure of a low-floor bus.
Figure 2:
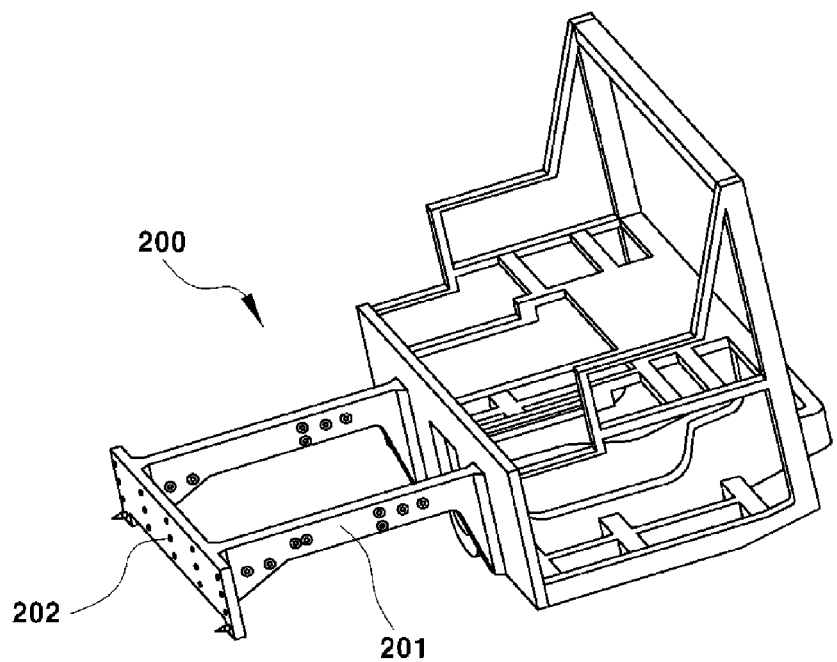
FIG. 2 is a view illustrating a rear frame of a low-floor bus.
Figure 3:
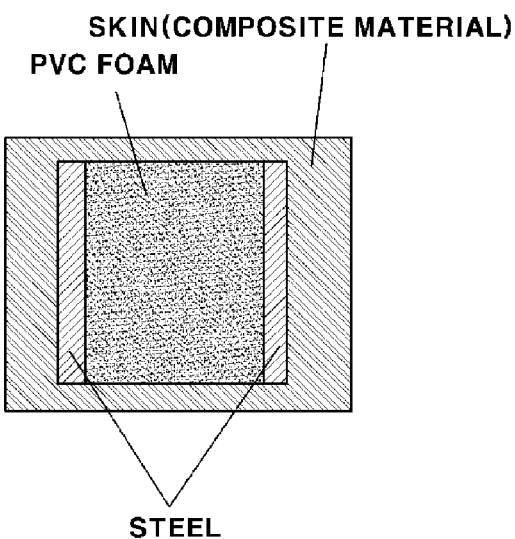
FIG. 3 is a view illustrating a modification of a foam material in a typical composite material frame.

Reference numerals set forth in the Drawings includes reference to the following elements as further discussed below:

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings.

Figure 4:
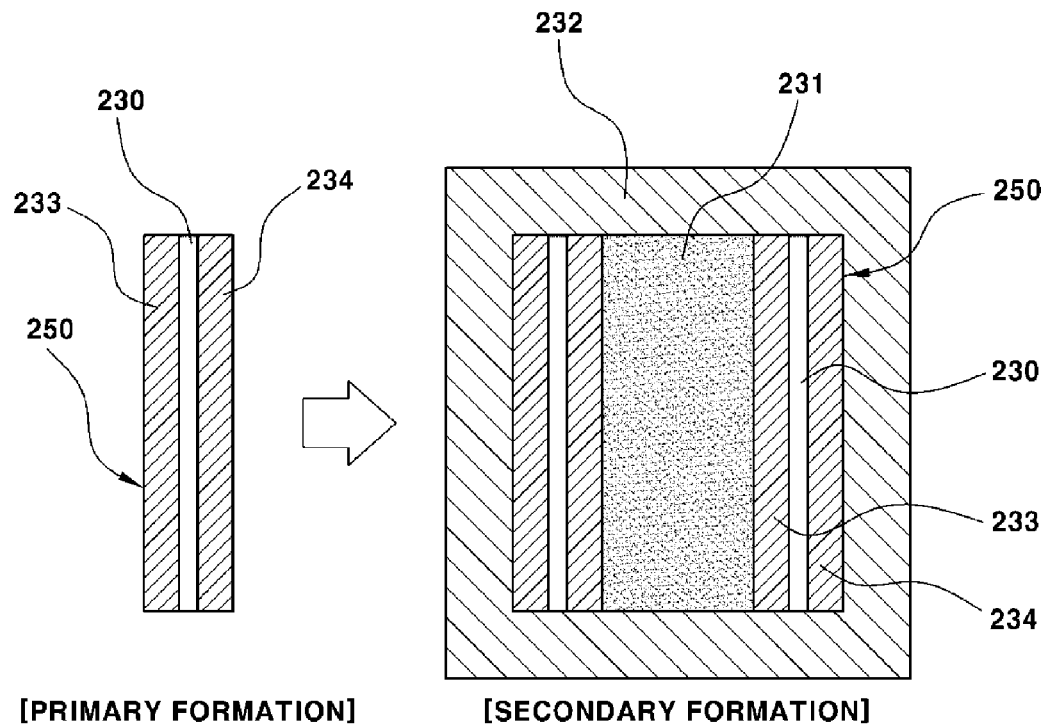
FIGS. 4 and 5 are views illustrating a chassis frame and a method for manufacturing the same according to an exemplary embodiment of the present invention.
Figure 5:
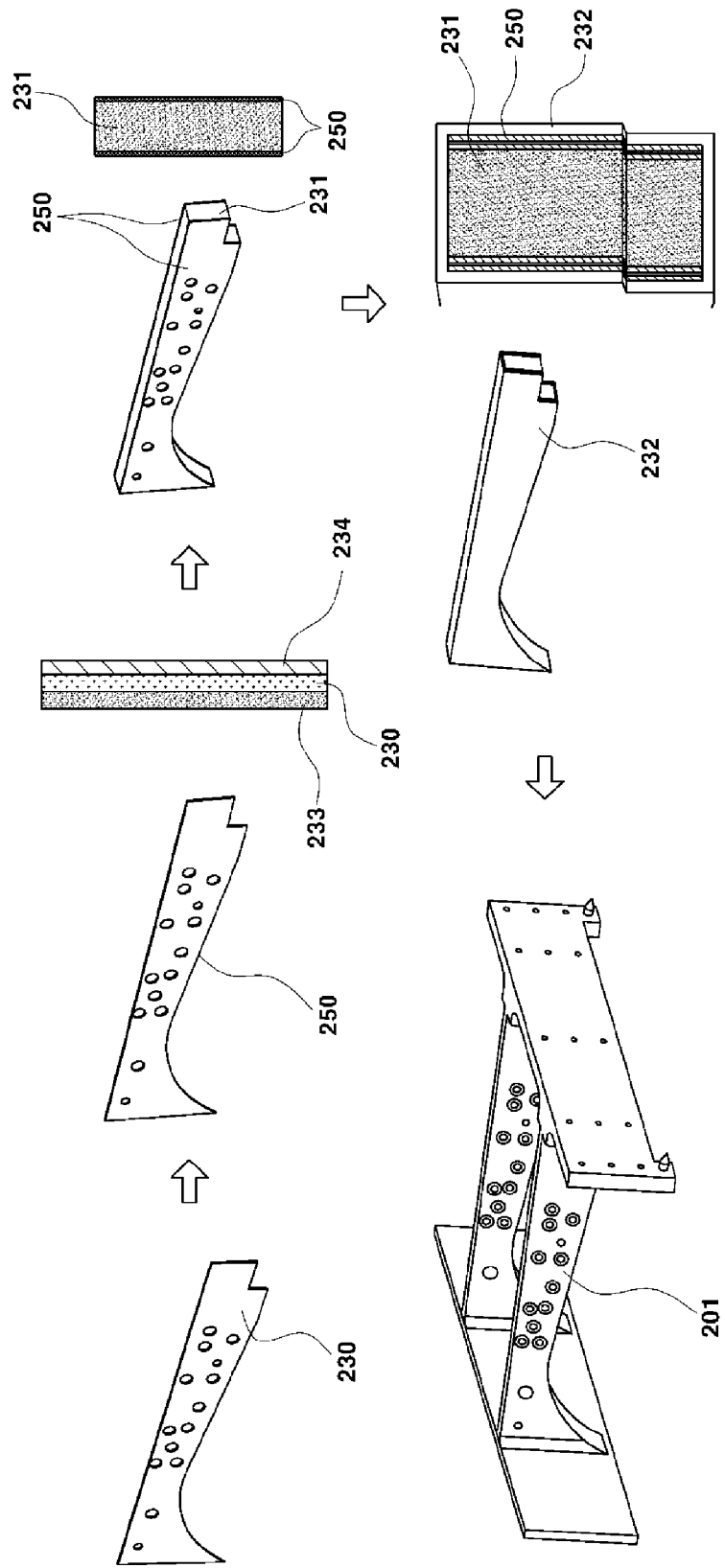

As shown in FIGS. 4 and 5, a chassis frame, i.e., a suspension connection part 201 of a rear frame according to an exemplary embodiment of the present invention may have a structure in which internal composite materials 233 and 234 are primarily laminated on both sides of a steel core material 230 and then the primarily formed product may be secondarily laminated on both sides of an internal core material 231 to be wholly covered by an external composite material skin.

In order to manufacture the chassis frame having such a section structure, internal composite materials such as Carbon Fiber Reinforced Plastic (CFRP) or Glass Fiber Reinforced Plastic (GFRP) may be laminated on the steel core material 230, and then may be disposed in a mold to be primarily cured.

Specifically, the internal composite materials 233 and 234 may be laminated on both sides of the steel core material 230, and then the laminate may be disposed in a mold. Thereafter, the laminate may be heated at a temperature of about 100° C. to about 150° C. to allow thermosetting resin carburized in fiber constituting the internal composite materials 233 and 234 to be integrally bonded to and hardened with the steel core material 230.

In this case, the number of the internal composite materials 233 laminated on one side of the steel core material 230 and the number of the internal composite materials 234 laminated on the other side of the steel core material 230 may be equal to each other. If the numbers of the internal composite materials 233 and 234 are different from each other, thermal deformation may occur in the steel core material 230.

The primarily-formed core material 250, i.e., the core material 250 having the internal composite materials 233 and 234 laminated on both sides of the steel core material 230 may be laminated on both surfaces of the internal core material 231. Thereafter, the surface of the primarily-formed core material 250 and the surface of the internal core material 231 that are exposed to the outside may be covered with a skin material, i.e., the external composite material 232, and then may be placed in a mold to be secondarily cured. Thus, the chassis frame product according to the exemplary embodiment of the present invention can be finished.

In this case, the internal core material 231 may be formed of PVC foam or Balsa material, and may serve to enlarge the section modulus while being disposed between the primarily-formed core materials 250.

The method for manufacturing the chassis frame may have the characteristics of a pre-preg method. In the pre-preg method, when internal and external composite materials used as a core material and a skin material have a one or multi-ply laminated structure in which fiber is carburized in a thermosetting resin, the carburized resin is molten at a high temperature of about 100° C. to about 150° C. to allow fiber to be cured with high strength.

Figure 6:
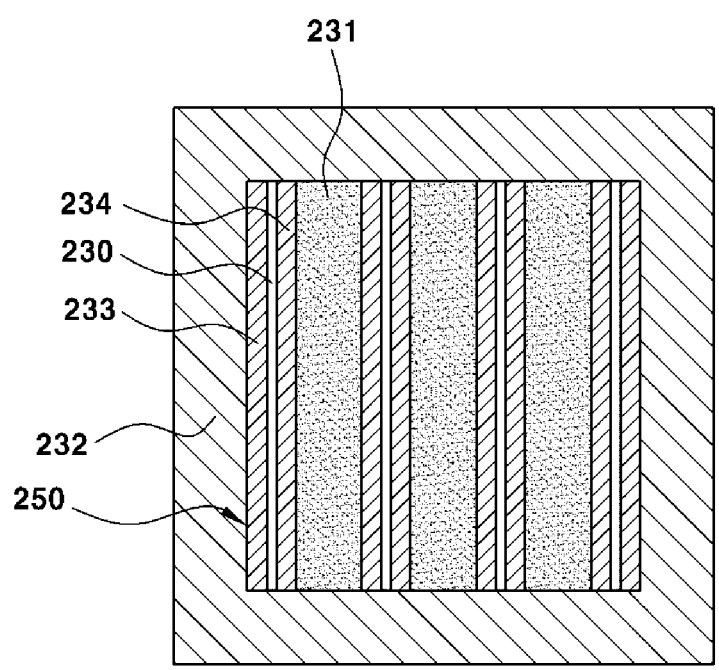
FIG. 6 is a view illustrating a structure of a chassis frame according to another embodiment of the present invention.

On the other hand, in order to increase of the stiffness of the chassis frame, i.e., the suspension connection part 201 of the rear frame, as shown in FIG. 6, the primarily-formed core material 250 may be laminated on the both sides of the internal core material 231 in a multi-layer, and then the external composite material 232 may cover the whole of the laminate of the primarily-formed core material 250 and the internal core material 231. Thereafter, the laminate may be inserted into a mold for secondary formation to obtain a chassis frame product having a more increased stiffness.

According to an exemplary embodiment of the present invention, since an internal composite material having similar rigidity to that of steel is disposed between a steel material used as a core material and a foam material, thermal deformation of the steel material can be prevented, thereby achieving sufficient rigidity and stiffness of a chassis frame as a whole.

Accordingly, it is possible to overcome limitations in that typical products cannot maintain a vertical state because a foam material is deformed and a steel material is deviated due to a rigidity difference between the foam material and the steel material that contact each other.

For convenience in explanation and accurate definition in the appended claims, the terms "internal" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A composite chassis frame comprising:
   a primarily-formed core material having a steel core material and internal composite materials laminated on both surfaces of the steel core material;
   an internal core material disposed between the primarily-formed core materials, wherein the primarily-formed core materials are laminated on both surfaces of the internal core material; and
   a secondarily-formed external composite material covering outer surfaces of the primarily-formed core materials and the internal core material as a skin material.

2. The composite chassis frame of claim 1, wherein the number of internal composite materials laminated on one surface of the steel core material is equal to the number of internal composite materials laminated on the other surface of the steel core material.

3. The composite chassis frame of claim 1, wherein the primarily-formed core material and the internal core material are mutually laminated in a multi-layer.

4. The composite chassis frame of claim 1, wherein the internal composite materials and the external composite material are formed of carbon fiber reinforced plastic or glass fiber reinforced plastic.

5. The composite chassis frame of claim 1, wherein the internal core material includes a polyvinyl chloride foam or a Balsa material.

6. A method for manufacturing the composite chassis frame of claim 1, comprising:
   laminating the internal composite materials on both surfaces of the steel core material and then performing primary forming and curing to form the primarily-formed core material;
   laminating the primarily-formed core materials on both surfaces of the internal core material; and
   covering the external composite material over the outer surfaces of the primarily-formed core materials and the internal core material, and then performing secondary forming and curing.

7. The method of claim 6, wherein the internal composite materials and the external composite material are formed of carbon fiber reinforced plastic or glass fiber reinforced plastic.

8. The method of claim 6, wherein the internal core material includes a polyvinyl chloride foam or a Balsa material.

9. The method of claim 6, wherein the number of internal composite materials laminated on one surface of the steel core material is equal to the number of internal composite materials laminated on the other surface of the steel core material.

* * * * *